INVENTOR
William A. Weightman
BY John P. Tabor
ATTORNEY

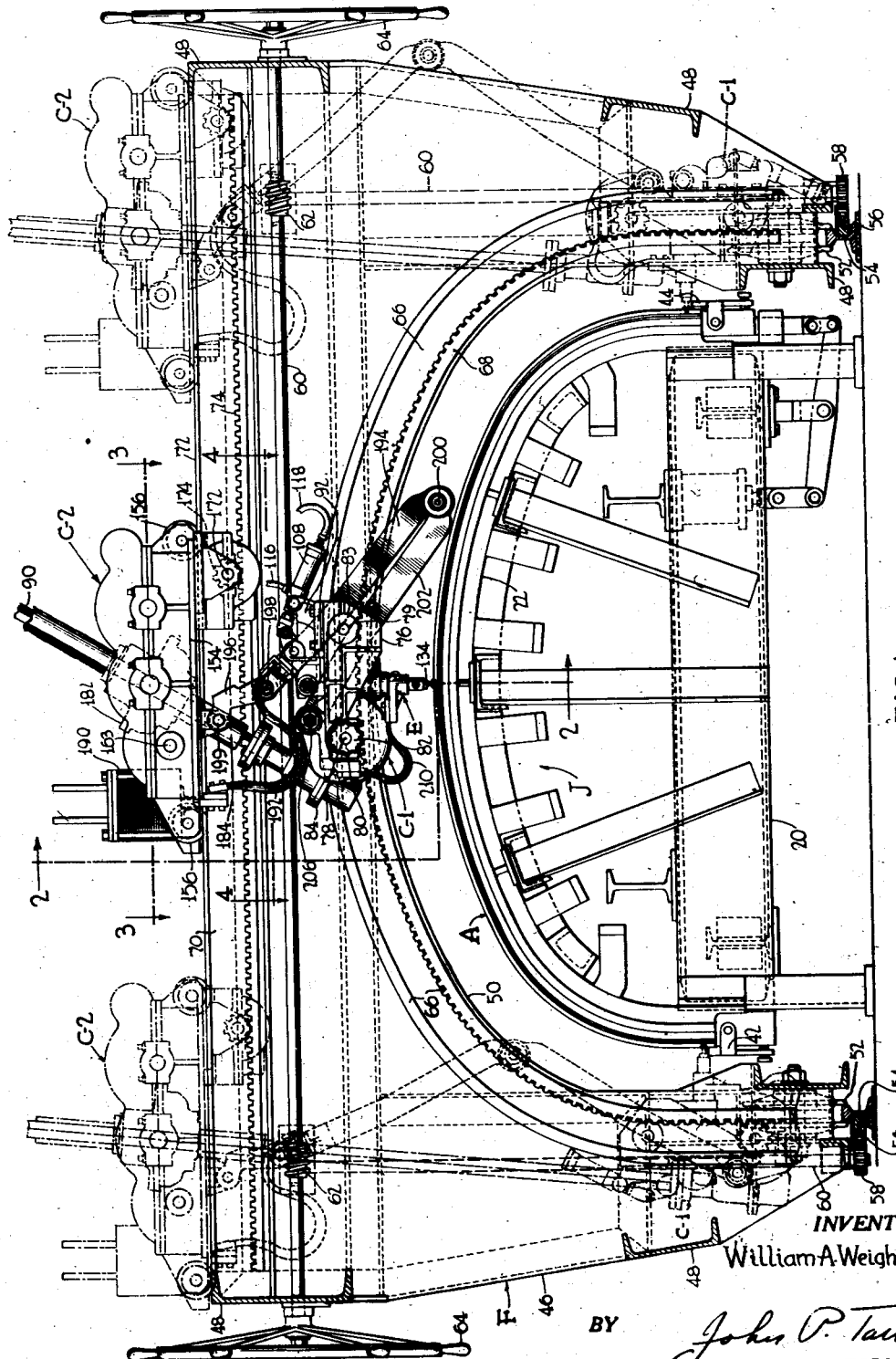

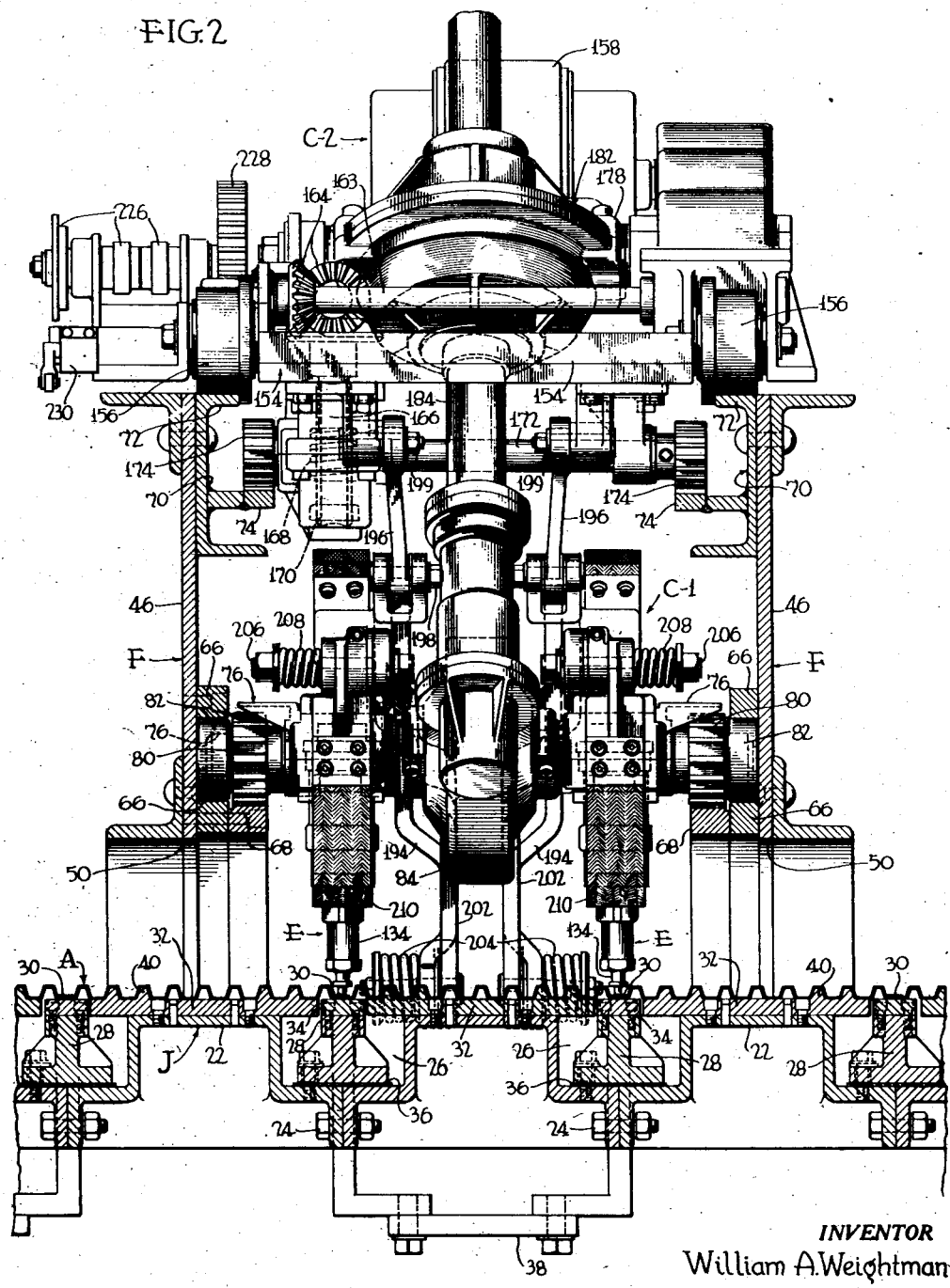

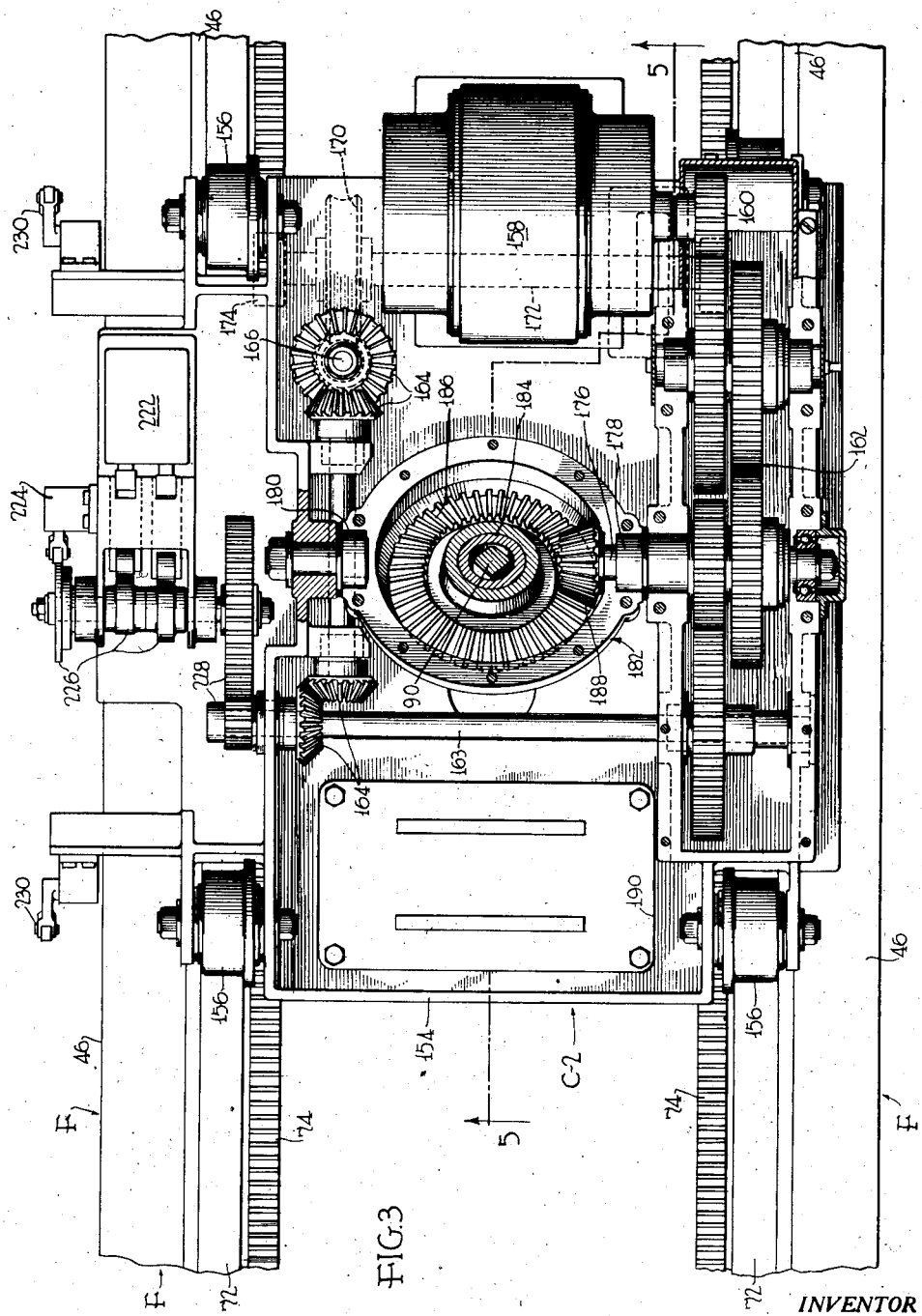

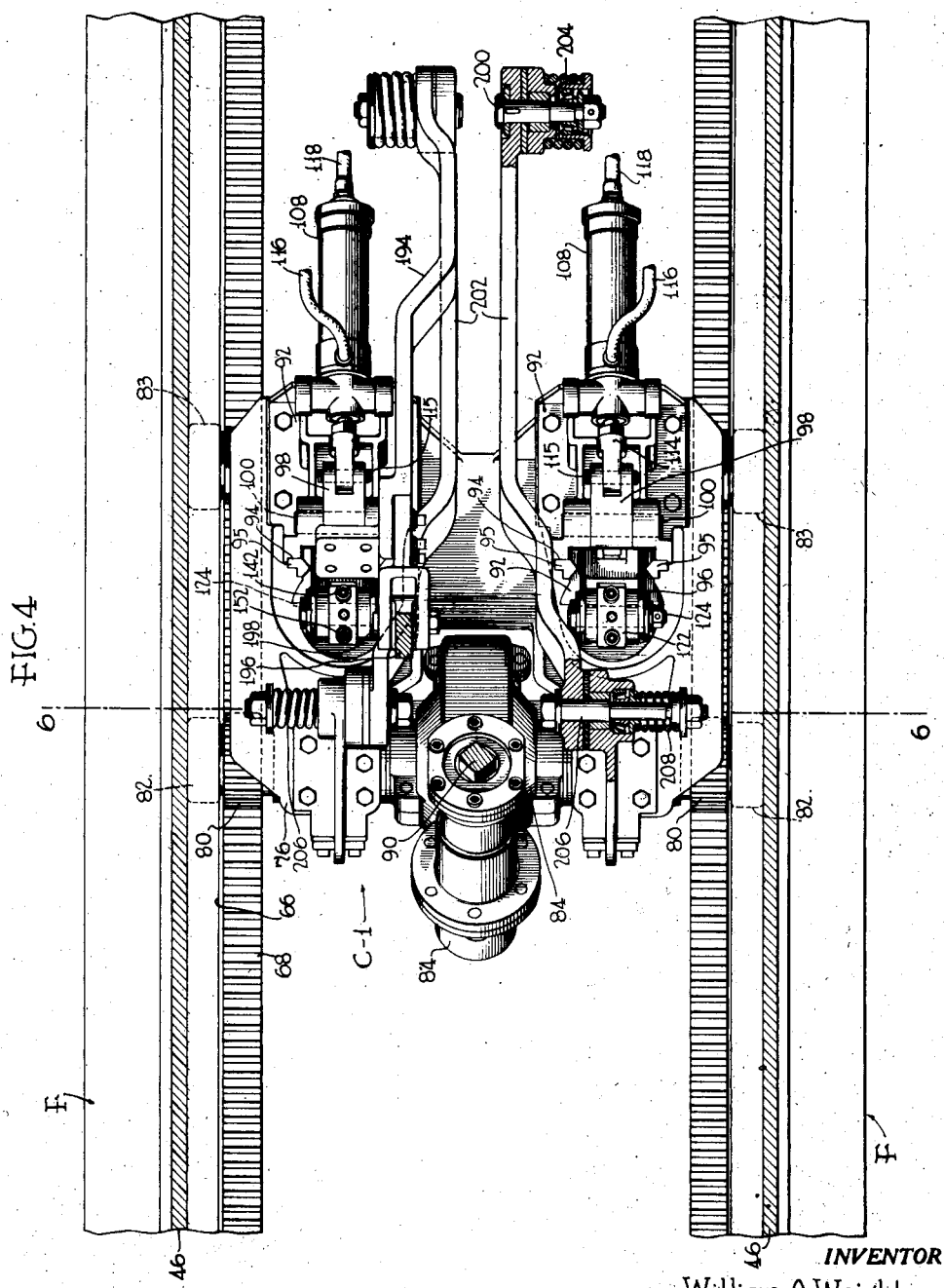

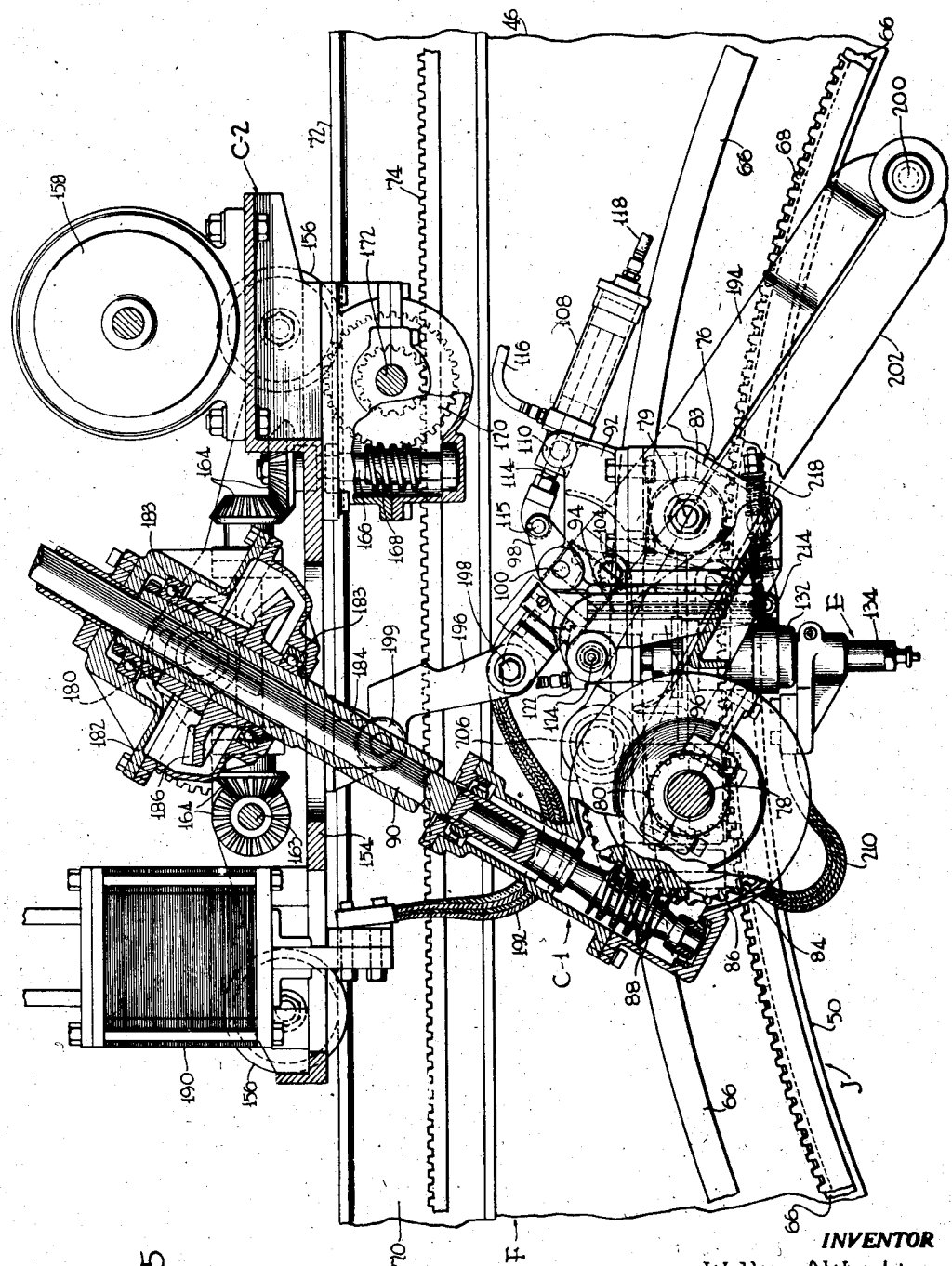

July 6, 1943.  W. A. WEIGHTMAN  2,323,361
WELDING APPARATUS
Filed April 30, 1941  7 Sheets-Sheet 7

INVENTOR
William A. Weightman
BY
John P. Tarbox
ATTORNEY

Patented July 6, 1943

2,323,361

UNITED STATES PATENT OFFICE 2,323,361

WELDING APPARATUS

William A. Weightman, Philadelphia, Pa., assignor to Edward G. Budd Manufacturing Company, Philadelphia, Pa., a corporation of Pennsylvania Application April 30, 1941, Serial No. 391,056

20 Claims. (Cl. 219—4)

This invention relates to electric spot welding apparatus, more particularly to spot welding apparatus of the traveling-electrode type for welding metal sheets of curvilinear contour.

One of the objects of the present invention is to provide welding apparatus of new and improved construction for spot welding sheets of metal of curvilinear contour with great dispatch and economy of operation.

Another object is to provide improved spot welding apparatus of the traveling-electrode type in which the electrode is mounted on a carriage adapted to move along a curvilinear path of travel with new and improved means for propelling the carriage and for conducting electric current to the welding electrode.

Another object is to provide a traveling welder with an electrode-supporting carriage which is movable along a curved path of travel and adapted to automatically perform spot welding operations at regular intervals on a workpiece of curvilinear contour, and with a second carriage movable along a straight-line path of travel and adapted to drive the electrode-supporting carriage along its curvilinear path of travel, which second carriage also supports a transformer for supplying current to the electrode.

Another object is to provide a traveling spot welder having a pair of carriages, one supporting an electrode device and the other supporting driving mechanism for propelling both carriages along different paths of travel with a new and improved means for conducting welding current from a transformer mounted on one carriage to the electrode device supported by the other carriage.

A further object is to provide a spot welding electrode device of improved construction which is adapted to travel relative to a fixed workpiece and perform spot welding operations at regular intervals while the support therefor is traveling continuously in a predetermined path and in which the electrode lags behind the support during each spot welding operation and returns thereafter to normal position for performing the next spot welding operation.

With the above and other objects in view, the present invention consists in certain features of construction and combinations of parts to be hereinafter described with reference to the accompanying drawings and then claimed.

In the drawings which illustrate a suitable embodiment of the invention:

Figure 1 is a side elevation of the spot welding apparatus, one of the side portions of the frame being removed to more clearly show the various parts of the welding apparatus;

Figure 2 is a vertical section taken approximately on the line 2—2 of Figure 1;

Figure 3 is a top plan view of the apparatus shown in Figure 1, portions of the housings for the driving mechanism being removed to show the driving mechanism in greater detail;

Figure 4 is a transverse section taken approximately on the line 4—4 of Figure 1, looking downwardly upon the carriage upon which the welding electrodes are mounted;

Figure 5 is a longitudinal section taken approximately on the line 5—5 of Figure 3;

Referring to the accompanying drawings, in which like numerals refer to like parts throughout the several views, the welding apparatus illustrated is especially adapted for electrically spot welding sheets of metal of curvilinear contour, although the improved electrode device associated therewith is suitable for welding sheets of metal in the flat.

The articles A selected for illustrations are corrugated strips of sheet metal of curvilinear contour having a sharp curvature at opposed regions, as shown in Figures 1 and 2, which are supported in arch-like arrangement on a correspondingly shaped stationary jig J (to be later described in detail) with the adjacent portions to be welded together in overlapping engagement as indicated at 30 in Figure 2.

In the welding apparatus of the present invention, the work remains stationary and the welding electrode or electrodes, as the case may be, move relative to the work and are so arranged as to start the welding operation at one end of the work and travel at a uniform rate in a curvilinear path of travel and spot weld the overlapping edges of the work A at regularly spaced intervals.

In general, the welding apparatus embodies a frame F recessed at its bottom side to bridge the article A as shown in Figure 1, a lower carriage C—1 supporting a pair of electrode devices E and being supported by the frame F for movement in a curvilinear path corresponding to the contour of the article A, and an upper carriage C—2 supported on the frame F for movement in a horizontal straight-line path above the carriage C—1. The carriage C—2 supports the means, to be later described, for propelling both carriages and a transformer for supplying electric current to the electrodes.

The jig J

Figure 8:
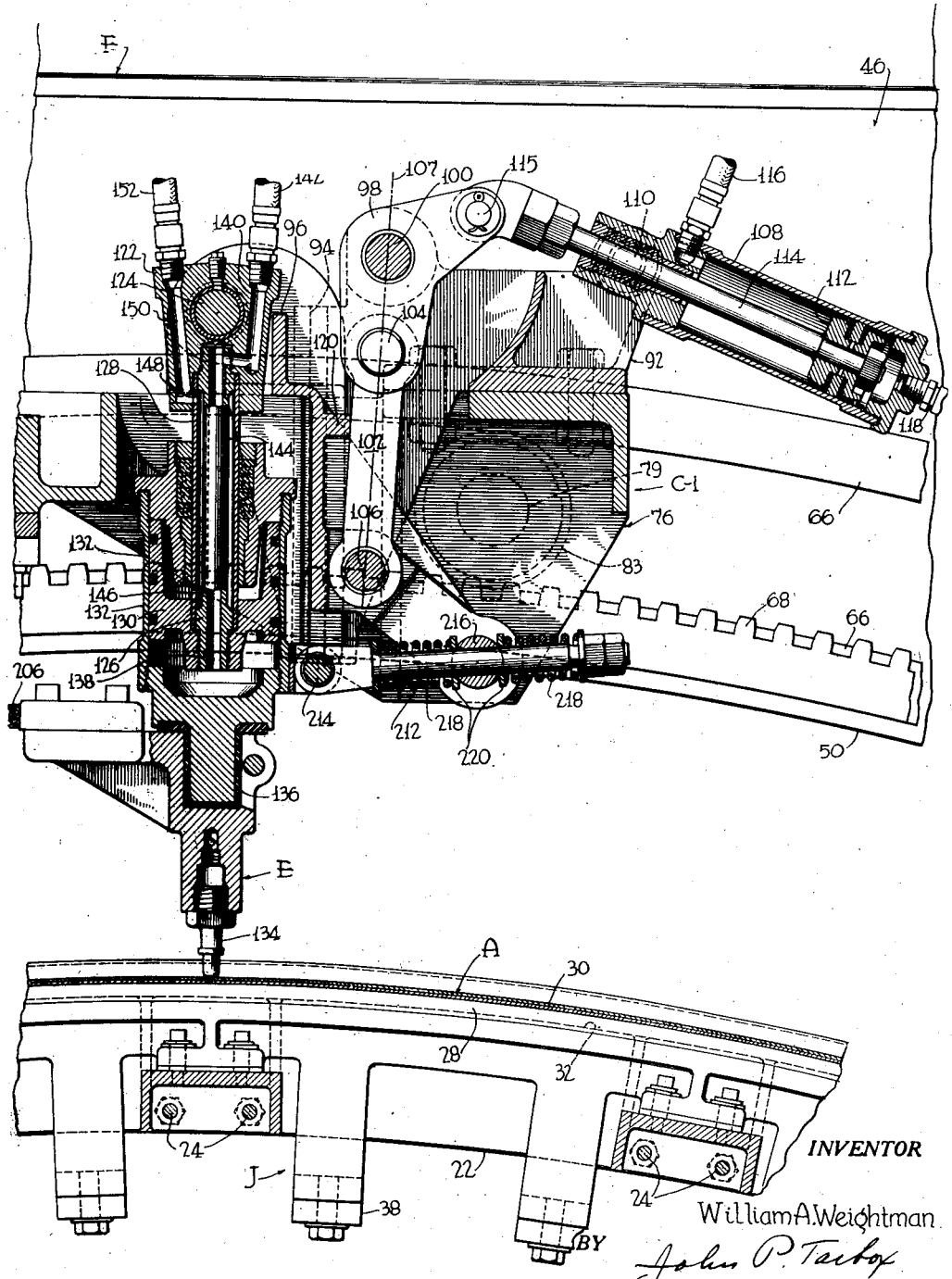
Figure 8 is a section similar to Figure 7, showing the electrode device in operative position for welding the workpiece.

The jig J as shown in Figures 1, 2 and 8, selected for illustration, embodies a bed 20 comprised of suitable rigid framing which supports a plurality of rigid arched members 22 having their ends secured to the bed 20. The members 22 are arched in shape to conform to the contour of the sheets of metal A and are secured together by bolts 24 to provide spaced recesses 26, as shown in Figure 2, extending from one end thereof to the other.

Supported within the recesses 26 are suitable electrode elements 28 having the exact curvilinear contour of the sheets A. Each electrode element 28 extends from end to end of its recess 26. Referring to Figure 2, it will be noted that each electrode element 28 supports the overlapping edges 30 of adjacent sheets A and that the intermediate portion of each sheet A is supported on plates 32 secured to the elements 22, each plate 32 being spaced slightly as shown at 34 in Figure 2 from the adjoining electrode element 28.

The electrode elements 28 are grouped in pairs, the elements of each pair being insulated from the members 22, as at 36, and electrically connected by a conductor bar 38.

The plate elements 32 are provided at spaced intervals with protuberances 40 conforming in cross-section to the shape of the corrugation of the sheet to nest within the corrugations and hold the sheets in proper position during the welding operation. Preferably the ends of the sheets A are secured to the plates 32 by means of suitable clamps 42 and 44 as shown in Figure 1, which tend to pull the arch-like sheets A into firm engagement with the electrode elements 28 and plates 32.

The frame F

The frame F as shown in Figures 1, 2 and 4 embodies spaced upright members 46 interconnected at their ends as shown in Figure 1 by cross members 48. The members 46 are recessed upwardly from their lower sides to provide an arch 50. Each leg of the arch is provided with spaced wheels 52 disposed to ride upon tracks or rails 54 arranged at the sides of the jig J. The frame F is movable along the rails 54 parallel to the jig J and the work A and may be provided with a propelling mechanism comprising racks 56 secured to the rails 54, and pinions 58 meshed with the racks 56. The pinions 58 may be rotated through shafts 60 and suitable gearing 62 by means of hand wheels 64 located at the ends of the frame as shown in Figure 1.

The upright members 46 are provided with channel-shaped guide tracks 66, the channels of which face each other as shown in Figure 2. Racks 68 are disposed adjacent the tracks 66, the tracks 66 and racks 68 corresponding in curvilinear contour with the work sheets A. It is to be noted that these tracks and racks are formed with substantially parallel end portions interconnected by curvilinear intermediate portions, the degree of curvature being relatively sharp adjacent the end portions.

The side portions 46 are also provided with longitudinally extending, parallel, inwardly facing, opposed channels 70 at their upper edges which provide upper tracks 72 and parallel upper racks 74 extending lengthwise, as shown in Figure 1, of the side portions 46 above the lower tracks 66 and racks 68.

The lower carriage C—1

The lower carriage is best illustrated in Figures 1, 2, 4, 5 and 8. It embodies a frame or support 76 having a shaft 78 at one end, to the ends of which pinions 80 and guide rolls 82 are secured. The guide rolls 82 fit closely within the channel tracks 66 and the pinions 80 mesh with the racks 68 as shown in Figure 2. The opposite end of the support 76 is provided with axially aligned stub shafts 79 having rolls 83 thereon which engage with and ride in the channel tracks 66. Referring to Figure 5, it will be seen that the support 76 includes a fixed housing 84 surrounding a worm gear 86 secured to the shaft 78 and supporting a worm 88 in mesh with the gear 86. The pinion 88 is held against axial movement and the axis thereof is disposed in a vertical plane. A suitable shaft 90 is secured to the pinion 88 coaxial therewith and extends forwardly therefrom for connection with the upper carriage C—2 in a manner to be presently described.

Figure 7:
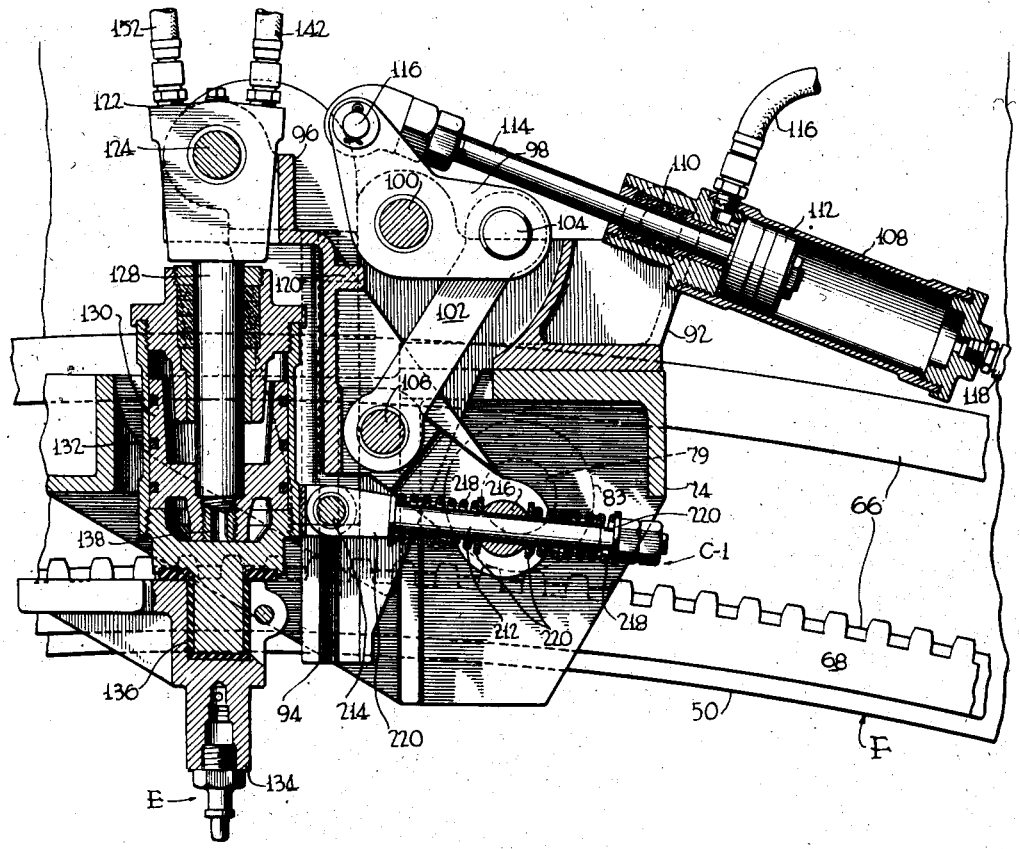
Figure 7 is an enlarged sectional view through one of the electrode devices showing the mechanism for operating the same.
Figure 6:
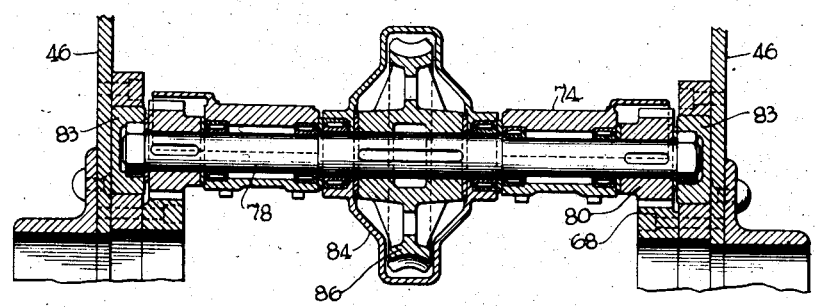
Figure 6 is a section taken approximately on the line 6—6 of Figure 4.

Suitably secured to the support 76 are bracket supports 92 having guideways 94 disposed perpendicular to a plane passing through the axes of the shaft 78 and stub shafts 79. Engaged with each way 94 of each bracket support 92 through gibs 95 for sliding movement therein is a bracket 96. Each bracket 96 is reciprocated within its way 94 by means of a linkage mechanism shown in Figures 7 and 8, which comprises a bell-crank lever 98 pivoted by means of a pivot pin 100 to the bracket support 92 and a link 102 pivoted at one end at 104 to one arm of the bell-crank lever 98 and at its other end to a pin 106 carried by the bracket 96. An air cylinder 108 is pivoted to the support 92 by means of a pivot pin 110. The cylinder is provided with a piston 112 having a shaft 114 which is pivoted by means of a pin 115 to the other arm of the bell-crank lever as shown in Figure 7. Air conduits 116 and 118 are provided at the opposite ends of the cylinder 108 for the flow of air into and out of the cylinder at opposite sides of the piston 112.

The retracted position of the bracket 96 is shown in Figure 7 and the extended position is shown in Figure 8. The extended position of the bracket 96 is predetermined by a stop 120 with which the link 102 engages, as shown in Figure 8, in which position it is to be noted that the axis of the pin 104 coincides with a line passing through the axes of the pins 100 and 106, as shown by the broken line 107 in Figure 8. As a result of this, pivotal movement of the bell-crank lever cannot be effected by forces exerted on the bracket 96 which ordinarily would tend to move the bracket to its retracted position. It is obvious that the bracket 96 can be retracted only by the admission of air into the cylinder 108 through the air conduit connection 118 to move the piston 112 to the left, as viewed in Figure 8.

Two electrode devices E are provided, as seen in Figure 2. Each electrode device embodies a support 122 pivoted by means of a pin 124 extending between the sides of the bracket 96 as shown in Figures 4 and 8. The support 122 is provided with a tubular extension 126 which is surrounded by a circumferentially spaced tube 128. A suitable piston 130 is secured to the outermost ends of the extension 126 and the tube 128. The piston 130 is housed within a cylinder 132, one end of which forms the support for an electrode 134 which is insulated, as shown at 136, from the end of the cylinder 132, as shown in Figure 8.

The tubular passage 138 of the extension 126 opens at one end into the space between the end of the cylinder 132 and the piston 130 and communicates at the other end with a passage 140 formed in the support 122, which, in turn, communicates with a suitable air conduit 142. The annular space 144 between the extension 126 and the tube 128 communicates at one end through an aperture 146 with the space between the piston 130 and the other end of the cylinder 132, and communicates at its opposite end through an aperture 148 with a passage 150 in the support 122, which, in turn, communicates with an air conduit 152. By admitting air under pressure through conduit 142, for example, such air will cause the cylinder 132 to move axially of the piston 130 toward the work A, as shown in Figure 8, and by introducing air under pressure through conduit 152 such pressure upon release of the air in conduit 142 will cause the cylinder 132 to axially retract to the position shown in Figure 7.

Each of the cylinders 132 is resiliently maintained in a normal position by means of a rod member 212 pivoted thereto by means of a pivot pin 214, the rod member 212 being slidable within a stub shaft 216. Coiled compression springs 218 are provided at opposite sides of the stub shaft 216 and surround the member 212, suitable abutments 220 being provided for the ends of the springs 218. The springs 218 obviously by reason of the slidable mounting of the rod member 212 tend to resiliently maintain the cylinder 132 in a normal position and will return the cylinder to the normal position from a pivoted position.

*The upper carriage C—2*

The upper carriage C—2 as shown in Figures 1, 2, 3 and 5 embodies a platform 154 having guide rollers 156 at opposite ends thereof engaged with the tracks 72 to movably support the platform. An electric drive motor 158 is supported on the platform 154 at one end for driving a speed-reducing gear train 162 through a pinion 160. A power take-off shaft 163 is provided at one point in the gear train 162 which through sets of bevel gears 164 drives a vertical shaft 166. The shaft 166 is provided with a worm pinion 168 which drives a worm gear 170 mounted on a horizontal shaft 172. The shaft 172 carries pinions 174 which mesh with the racks 74 whereby to propel the carriage C—2 along the frame portions 46.

A power take-off shaft 176 is provided at another point of the gear train 162, which shaft is journalled in a bearing 178 mounted at one side of the carriage platform 154. The bearing 178 is axially aligned with a cylindrical member 180 mounted at the opposite side of the carriage platform 154. The bearing 178 and the member 180 pivotally support a housing 182 as shown in Figure 3. The housing 182 is provided with axially aligned bearings 183 which support a tubular shaft 184. The shaft 184 is provided with a bevel gear 186 fixed thereto which meshes with a bevel pinion 188 secured to the take-off shaft 176 so that upon operation of the gear train 162 the pinion 188 is caused to rotate the gear 186 and the shaft 184. The passage through the tubular shaft 184 is square and slidably receives the upwardly extending shaft 90 of the lower carriage C—1, which latter shaft is correspondingly shaped in cross-section so that it, in turn, is rotated by the shaft 184 to rotate the worm pinion 88 and thereby propel the lower carriage C—1.

The platform 154 also supports a transformer 190 connected in a suitable manner (not shown) with a source of electrical energy. One pole of the secondary of the transformer is connected through a conductor 192 to one end of a bus bar 194 pivoted to a link 196 by means of a pivot pin 198, which link is, in turn, pivoted at 199 to the platform 154.

The other end of the bus bar 194, as shown in Figures 4 and 5, is pivoted by means of pivot pin 200 to a second bus bar 202, a coiled spring 204 being employed to resiliently hold the ends of the bus bars together in good electrical contact. The other end of the bus bar 202 is pivoted by means of a pin 206 to the carriage C—2 as shown in Figure 4, a coiled compression spring 208 being employed to insure a firm yet resilient electrical contact. A flexible conductor 210 connects the carriage frame with the electrode 134.

Each electrode 134 is connected in this manner with the secondary of the transformer so that the current flow is from one pole of the transformer through the pivoted bus bars 194 and 202, through the metal A to be welded and the one electrode element 28, to the conductor bar 38 and back to the other pole of the secondary of the transformer in the reverse order.

If only one electrode is employed, then, of course, the conductor bar 38 is omitted and the one electrode element 28 is connected with the last-mentioned pole of the transformer secondary.

Suitable means are provided for controlling the supply of air under pressure to the cylinders 108 and 132 and also for timing the flow of current to the transformer 190. The cylinder air supply and the current supply are timed with respect to each other in order that each welding operation is performed at timed intervals properly correlated with the supply of air to the electrode-actuating cylinders. In Figure 3 the numerals 222 and 224 indicate air control and current control timers respectively, which are actuated by cam elements 226 driven through suitable gearing 228 from the power take-off shaft 163.

The connections between the air supply conduits 116, 118, 142 and 152 and the air control timer 222 have not been shown, but it is to be understood that the timer 222 may be of any suitable construction and may be connected in a suitable manner with such conduits. Likewise, the electrical connections between the transformer and current timer have not been shown.

Suitable limit switches 230 may be provided on the upper carriage C—2 for cutting off the supply of current when the carriage C—2 reaches the end of its travel in either direction.

*Operation*

At the start of the welding operation the lower carriage C—1 is positioned at one end of the sheets A to be welded such as, for example, in the position indicated in broken outline at the right in Figure 1. It is to be noted that in this position of the carriage C—1 the carriage C—2 is likewise located at the right end of the frame and it can be seen that the carriage C—1 is at its maximum distance from the carriage C—2, in which position the driving connection through the shafts 90 and 184 is extended and the bus bars 194 and 202 are pivoted to an extended position. The brackets 96 which support the welding electrodes originally are retracted and in the position shown in Figure 7. Before the welding operation is started, air under pressure is admitted through the conduits 116 into the cylinders 108 which causes the pistons 112 to move to the right, as viewed in Figure 7, to actuate the bell-crank levers 98 and links 102, which moves the brackets 96 to the extended position shown in Figure 8. This brings the electrodes 134 in close proximity to the sheets A. The apparatus thus is in position for performing the welding operation. The carriage C—1 during the welding operation moves from the position shown in broken outline at the right of Figure 1 to the position shown in broken outline at the left in Figure 1. The carriage C—2 likewise moves from the right end of the frame to the left end of the frame. The spot welding of the two overlapping sheets A occurs at regular intervals throughout the travel of the lower carriage and is brought about by the timer devices 222 and 224. The carriage C—1 moves continuously at a uniform rate of speed and drives the carriage C—2 at a uniform speed. At each interval corresponding to the desired spacing of the spot welds air is admitted under pressure, under the control of the timer 222, through the conduits 142, which air flows through the passages 140 and the tubular extensions 162 into the spaces between the pistons 130 and the closed end of the cylinders 132 to move the cylinders axially away from the pistons to create the desired pressure on the overlapping sheets A between the electrode elements 28 and the electrodes 134, the flow of current being timed to perform the welding operation upon the creation of the pressure upon the overlapping sheets A in the manner just described. The carriage C—1, of course, is traveling continuously from the right to the left, as viewed in Figure 8, and due to the pressure engagement of the electrodes 134 with the sheets A, the electrodes 134, the cylinders 132 and the supports 122 pivot as unitary structures about the pivot pins 124 with the result that the electrode devices lag behind the movement of the carriage C—1 and thus compress the springs 218. This lag is substantially momentary and only sufficient to permit the proper spot welding operation. At the properly timed interval the flow of air through conduits 142 is released and flow is produced through the conduits 152, which air under pressure acts between the pistons 130 and the packing end of the cylinders 132 to retract the pistons and electrodes 134, at which time springs 218 return the cylinders 132 from their pivoted positions to their normal positions ready for the next cycle of operation. This cycle of operation is repeated throughout the entire travel of the carriage C—1 from one end to the other of the work being welded.

When the welding operation along the two seams is completed the air under pressure flowing through the conduits 116 is released and air under pressure is admitted through the conduits 118 which restores the pistons 112 to a position at the left of the cylinders, as viewed in Figure 8, and retracts the brackets 96 to move the electrode devices back to the position indicated in Figure 7. This movement is sufficient for the electrodes 134 to clear the corrugations of the work being welded.

The operator, if additional seams are to be welded, then rotates one of the hand wheels 84 which through the shafts 60, the gears 62 and the pinion 58 and rack 56 moves the entire welding apparatus longitudinally of the work to position the welding electrodes above another pair of seams. The piston 112 is again caused to move to the position shown in Figure 8 to condition the apparatus for the spot welding of the second pair of seams and during this welding operation the carriages move from the left to the right end of the frame F.

It is seen from the foregoing description that novel means is provided for actuating an electrode-supporting carriage for welding sheet metal articles of curvilinear contour, especially articles of relatively sharp curvature. The welding operation is automatic, and by providing the continuous moving carriage the welding operation is performed rapidly and uniformly. Another important feature of the present invention is that the means for driving the electrode-supporting carriage is efficient in its operation and eliminates the use of trailing cables and conduits adjacent the welding electrode. The particular construction described also further permits the welding transformer to be carried by the mechanism which operates the electrode-supporting carriage.

The electrode device itself, that is, the entire carriage C—1, is also equally as adaptable for use in welding flat sheets of metal as the welding of sheets of curvilinear contour.

While two electrodes have been shown connected in series, it is to be understood that only one electrode may be employed.

The machine is reversible in its operation and is movable longitudinally of the article to be welded so that rows of spot welds may be provided which is advantageous particularly in sheets of large size in that it is not necessary to move the sheets. The machine is also advantageous where welded sheets are being produced in quantity production as no time is lost by the need of returning the welded electrodes to an initial starting position.

Though only a single form of the invention is illustrated and described the invention is not limited thereto but may be embodied in various forms as desired. As various changes in construction and arrangement of parts may be made without separating from the spirit of the invention as will be apparent to those skilled in the art, reference will be had to the appended claims for a definition of the limits of the invention.

Certain inventive features hereinbefore disclosed and described are the subject matter of applicant's divisional application Serial No. 427,560, "Welding apparatus," filed January 21, 1942.

What is claimed is:

1. A traveling welder comprising a supporting frame, first and second movable carriages, each supported on said frame for movement in a predetermined path of travel, driving means carried by said first carriage, a welding electrode carried by said second carriage, and driving connections between said driving means and said first carriage and between said driving means and second carriage whereby actuation of said driving means moves said carriages along their predetermined paths of travel said driving connection between the driving means and second carriage being adjustable whereby the distance between carriages is capable of variation to accommodate for different positions of the carriages along the tracks.

2. A traveling welder comprising a supporting frame, first and second movable carriages, means for supporting and guiding said first carriage on said frame for movement in a straight-line path of travel, means for supporting and guiding said second carriage on said frame for movement in a curvilinear path of travel, driving means carried by said first carriage, a welding electrode carried by said second carriage, a driving connection between said driving means and first carriage for propelling said first carriage along its path of travel, and an extensible driving connection between said driving means and said second carriage for propelling said second carriage along its curvilinear path of travel, simultaneously with the travel of said first carriage.

3. A traveling welder comprising a supporting frame, first and second movable carriages, means for supporting and guiding said first carriage on said frame for movement in a straight-line path of travel, means for supporting and guiding said second carriage on said frame for movement in a curvilinear path of travel, a welding electrode carried by said second carriage, a common propelling means for said carriages for propelling the same along their respective paths of travel, said propelling means being carried by said first carriage for movement therewith, a driving connection between said propelling means and first carriage, and a second driving connection between said propelling means and second carriage, said second driving connection being extensible to permit travel of said second carriage in its curvilinear path of travel during movement of said first carriage in its straight-line path of travel.

4. A traveling electric welder comprising a frame, a first carriage, means for supporting and guiding said carriage on said frame along a straight-line path of travel, a driving motor carried by said carriage and having a driving connection therewith for propelling it along its path of travel, an electric transformer carried by said carriage, a second carriage, a welding electrode carried by said second carriage, means for supporting and guiding said second carriage on said frame for movement in a curvilinear path of travel, an extensible driving connection between said driving motor and second carriage for propelling said second carriage along its path of travel, and an extensible electrical conductor between said transformer and electrode.

5. A traveling electric welder comprising a frame, a first carriage, means for supporting and guiding said carriage on said frame along a straight-line path of travel, a driving motor carried by said carriage and having a driving connection therewith for propelling it along its path of travel, an electric transformer carried by said carriage, a second carriage, a welding electrode carried by said second carriage, means for supporting and guiding said second carriage on said frame for movement in a curvilinear path of travel, an extensible driving connection between said driving motor and second carriage for propelling said second carriage along its path of travel, and an extensible electrical conductor between said transformer and electrode, said electrical conductor comprising a pair of bus bars pivotally connected together, one of said bus bars being pivoted to said first carriage and electrically connected with said transformer, and the other of said bus bars being pivoted to said second carriage and electrically connected to said electrode.

6. In a traveling electric welder, a supporting frame recessed at its bottom side between its ends to bridge a workpiece of arch-like contour to be welded, a guide track on said frame conforming in curvature to the workpiece, a carriage mounted for movement along said track, an electrode carried by said carriage, a second track on said frame disposed above said first track, a second carriage mounted for movement along said second track, a driving motor carried by said second carriage, means on said second carriage connected with said driving motor for propelling said second carriage along its track, and driving means on said first carriage having an extensible connection with said driving motor for propelling said first carriage along its track.

7. In a traveling electric welder, a supporting frame recessed at its bottom side between its ends to bridge a workpiece of arch-like contour to be welded, a guide track on said frame conforming in curvature to the workpiece, a carriage mounted for movement along said track, an electrode carried by said carriage, a second track on said frame disposed above said first track, a second carriage mounted for movement along said second track, an electric transformer carried by said second carriage, a conductor of electricity connecting said transformer and electrode, and means carried by said second carriage for simultaneously propelling said first and second carriages along their respective tracks.

8. In a traveling electric welder, a supporting frame recessed at its bottom side between its ends to bridge a workpiece of arch-like contour to be welded, a guide track on said frame conforming in curvature to the workpiece, a carriage mounted for movement along said track, an electrode carried by said carriage, a second track on said frame disposed above said first track, a second carriage mounted for movement along said second track, a transformer carried by said second carriage, a pair of bus bars pivotally connected at adjacent ends, one of said bus bars being pivoted to said first carriage and electrically connected with said electrode, and the other of said bus bars being pivoted to said second carriage and electrically connected with said transformer, and means carried by said second carriage for simultaneously propelling said first and second carriages along their respective tracks.

9. In a welding device of the character described having first and second carriages movable along different predetermined paths of travel, the first above the second, a welding electrode carried by said second carriage common drive means for said carriages, said drive means being mounted on said first carriage for movement therewith, means associated with said first carriage and drive means for propelling the first carriage along its path of travel, and means associated with said second carriage and driving means for propelling the second carriage along its path of travel, said last-named means being extensibly connected with said drive means.

10. In a welding device of the character described having a frame provided with non-parallel upper and lower carriage guiding tracks, an upper carriage mounted for movement on said upper track, an electrode-supporting carriage mounted for movement on said lower track, a rack for said upper carriage, an upper pinion rotatably supported by said upper carriage in meshed engagement with said rack, a lower rack for said lower carriage, a lower pinion rotatably carried by said lower carriage in meshed engagement with said lower rack, a gear train carried by said upper carriage, an electric motor mounted on said upper carriage for driving said gear train, a driving connection between said gear train and upper pinion, and extensible driving means between said gear train and lower pinion.

11. In a welding device of the character described having a frame provided with non-parallel upper and lower carriage guiding tracks, an upper carriage mounted for movement on said upper track, an electrode-supporting carriage mounted for movement on said lower track, a rack for said upper carriage, an upper pinion rotatably supported by said upper carriage in meshed engagement with said rack, a lower rack for said lower carriage, a lower pinion rotatably carried by said lower carriage in meshed engagement with said lower rack, a gear train carried by said upper carriage, an electric motor mounted on said upper carriage for driving said gear train, a driving connection between said gear train and upper pinion, and a pair of telescoped shaft members united for dependent rotation and sliding movement relative to each other, one of said shaft members being rotatably supported on said lower carriage in driving connection with said lower pinion and the other of said shaft members being pivotally mounted on said upper carriage in driven connection with said gear train and upper pinion.

12. In a traveling electric welder having a frame and upper and lower carriages movable longitudinally of the frame in predetermined paths of travel, the upper carriage in a straight-line path and the lower in a curvilinear path in which said lower carriage is adapted to move vertically with respect to said upper carriage, an electric current transformer carried by said upper carriage, a welding electrode carried by said lower carriage, and an electrical conductor connecting said transformer and electrode, said conductor being extensible to permit relative vertical movement of said carriages away from each other.

13. In a traveling electric welder having a frame and upper and lower carriages movable longitudinally of the frame in predetermined paths of travel, the upper carriage in a straight-line path and the lower in a curvilinear path in which said lower carriage is adapted to move vertically with respect to said upper carriage, an electric current transformer carried by said upper carriage, a welding electrode carried by said lower carriage, and an electrical conductor connecting said transformer and electrode, said conductor comprising a pair of rigid bus bars pivoted together, one of which is pivoted to said upper carriage and electrically connected to said transformer and the lower of which is pivoted to said lower carriage and electrically connected to said electrode.

14. In a traveling electric welder having a frame and upper and lower carriages movable longitudinally of the frame in predetermined paths of travel, the upper carriage in a straight-line path and the lower in a curvilinear path in which said lower carriage is adapted to move vertically with respect to said upper carriage, a welding electrode carried by said lower carriage, a driving motor carried by said upper carriage, speed-reducing means carried by said upper carriage driven by said motor, means associated with said upper carriage and having a driven connection with said speed-reducing means for propelling said upper carriage along its path of travel, and means associated with said lower carriage and having an extensible driven connection with said speed-reducing means for propelling said lower carriage along its path of travel.

15. In a traveling electric welder having a frame and upper and lower carriages movable longitudinally of the frame in predetermined paths of travel, the upper carriage in a straight-line path and the lower in a curvilinear path in which said lower carriage is adapted to move vertically with respect to said upper carriage, a welding electrode carried by said lower carriage, a driving motor carried by said upper carriage, speed-reducing means carried by said upper carriage driven by said motor, means associated with said upper carriage and having a driven connection with said speed-reducing means for propelling said upper carriage along its path of travel, and means associated with said lower carriage and having a driven connection with said speed-reducing means for propelling said lower carriage along its path of travel, said last-mentioned means comprising propelling means for said lower carriage, a rotatable shaft carried by said lower carriage in axially fixed relation with respect thereto for driving said propelling means, a second shaft having an axially slidable driving connection with said first shaft, the axes of said shafts being in a vertical plane, a housing for said second shaft pivoted about a horizontal axis to said upper carriage, and a driving connection between said speed-reducing means and said second shaft.

16. In a traveling welder having a supporting frame, a movable first carriage, a reciprocable welding electrode carried by said carriage, a track for guiding said carriage, said track having spaced substantially parallel end portions and an interconnecting curvilinear portion, said carriage being movable from one end of said track to the other, means for supporting a workpiece of a contour the same as said track and in uniformly spaced relation with respect thereto, a second straight section track adjacent said first track disposed in parallel relation with respect to a line passing through the ends of said curvilinear portion, a movable second carriage mounted on said second track, an electric current transformer supported by said second carriage and having an electrical connection with said electrode, a carriage-driving motor supported by said second carriage, means connected with said motor for driving said second carriage, and means extending between said carriages and connected with said motor for driving said first carriage.

17. A traveling welder comprising a supporting frame, first and second movable carriages, each supported on said frame for movement in a normally divergent path of travel, driving means carried by said first carriage, a welding electrode carried by said second carriage, and driving connections between said driving means and said first carriage and between said driving means and second carriage whereby actuation of said driving means moves said carriages along their predetermined paths of travel, said driving connection between the driving means and second carriage being adjustable whereby the distance between carriages is capable of variation to accommodate for different positions of the carriages along the tracks.

18. In a welding device of the character described, a frame, first and second carriages, normally divergent tracks mounted on said frame for supporting each of said carriages, an electrode supported by said second carriage, common drive means for said carriages, said drive means being mounted on said first carriage for movement therewith, means associated with said first carriage and drive means for propelling the first carriage along its path of travel, and means associated with said second carriage and driving means for propelling the second carriage along its path of travel, said last-named means being extensibly connected with said drive means.

19. In a welding apparatus a frame, first and second movable carriages separately carried on said frame for movement along separate predetermined paths of travel, a welding electrode carried by one of said carriages, current supply means carried by the other of said carriages and connected with said electrode, and means for driving said carriages along said predetermined paths of travel.

20. In a welding apparatus a frame, first and second movable carriages separately carried on said frame for movement along separate predetermined paths of travel, a welding electrode carried by one of said carriages, current supply means carried by the other of said carriages and connected with said electrode, and common means for driving said carriages along said predetermined paths of travel.

WILLIAM A. WEIGHTMAN.